J. EDGE.
Seed-Planter.
No. 63,147. Patented Mar. 26, 1867.
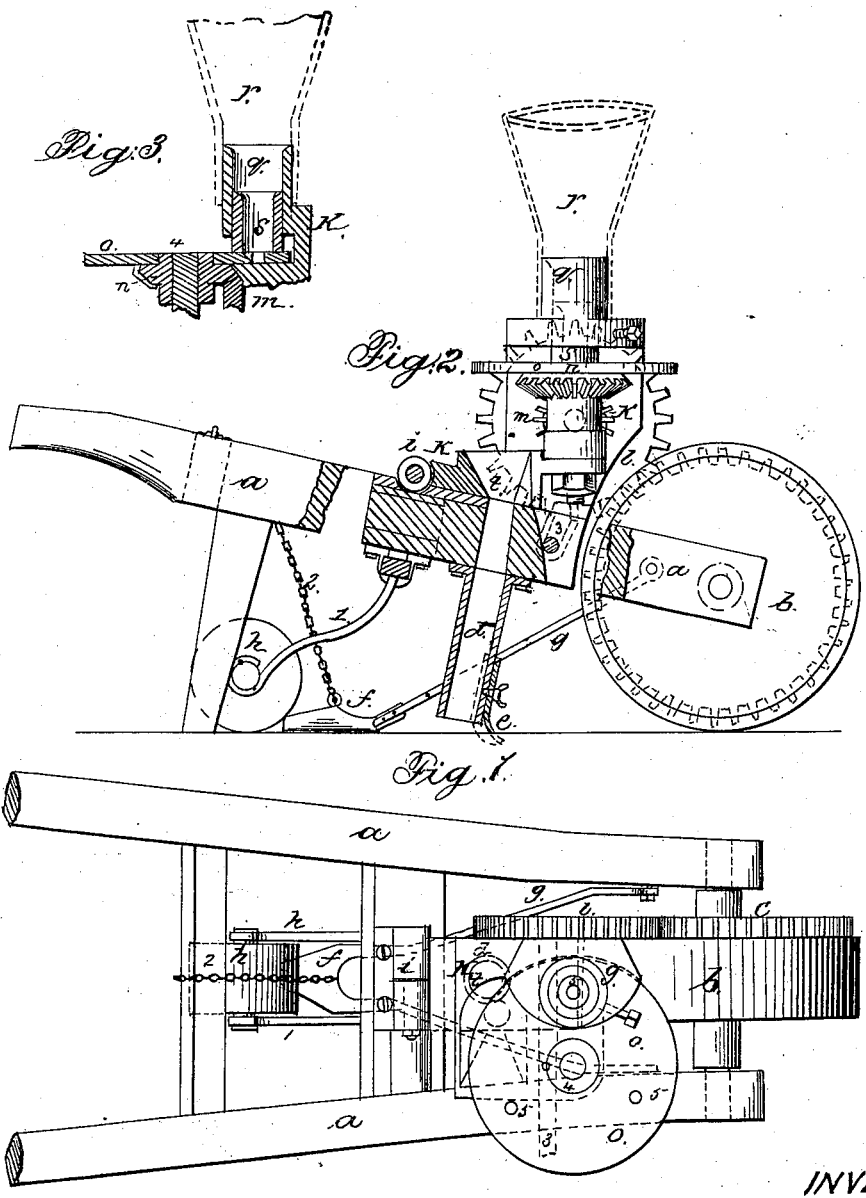

United States Patent Office.

JAMES EDGE, OF ACQUACKANONCK, NEW JERSEY.

*Letters Patent No. 63,147, dated March 26, 1867.*

---

IMPROVEMENT IN SEED PLANTERS.

---

*The Schedule referred to in these Letters Patent and making part of the same.*

---

TO ALL WHOM IT MAY CONCERN:

Be it known that I, JAMES EDGE, of Acquackanonck, in the county of Passaic, and State of New Jersey, have invented, made, and applied to use a certain new and useful Improvement in Seed Planters; and I do hereby declare the following to be a full, clear, and exact description of the said invention, reference being had to the annexed drawing, making part of this specification, wherein—

Figure 1 is a plan of my seed planter; and

Figure 2 is an elevation of the same with the frame removed at one part to show the seed tube in section.

Similar marks of reference denote the same parts.

My invention relates to a hand seed planter, and consists in a frame similar to a wheel-barrow, carrying a hopper for the seed, a drill or planter, a covering hoe, and a roller. The seeds are supplied periodically by a revolving disk containing holes and taking the seed from the hopper and dropping them in the seed tube. This disk is made changeable, so that one with a greater or less number of larger or smaller holes can be substituted for another, and the hopper throat is made movable, so that a thicker or thinner disk may be introduced. By this construction I am enabled to plant a greater or less quantity of seeds at greater or less distances apart; and I fit the hopper and seed-distributing apparatus so that it may be thrown out of gear while the planter is being wheeled to the field, or said hopper and the parts connected may be taken entirely away from the frame for housing or preparing for future use.

In the drawing, $a$ is a frame with handles like a wheel-barrow. $b$ is the wheel, with a cog-wheel, $c$, on one side. $d$ is a seed tube attached to the under side of the frame $a$, having a suitable shoe, $e$, at its lower end to open the furrow. I prefer that the shoe $e$ be adjustable to regulate the depth of planting. $f$ is a covering hoe drawn by the rods $g$, extending from the frame $a$, and $h$ is a roller drawn by slings 1 from the frame $a$, and 2 is a chain by which the covering hoe $f$ may be raised or lowered. I provide a secondary frame, $k$, attached to the frame $a$ by the hinge $i$. This hinge $i$ is a slip-hinge, so that when the frame $k$ is swung over sufficiently to allow its base to come out of a recess for it in the frame $a$ then the frame $k$ and the parts it carries can be removed from the frame $a$, or, by the reverse operation, be attached thereto. This frame $k$ carries the wheel $l$ that gears into the wheel $c$, and a pin, 3, passing through the frame $a$, and a staple projecting down from the under side of the frame $k$, holds the wheels in gear, or when the pin 3 is withdrawn and the frame $k$ partly turned up, the wheels $l$ and $c$ are separated. Any suitable lock or bolt may be used in place of the staple and pin 3. The wheel $l$ gives motion to the mitre-wheels $m$ and $n$, the latter of which is on a vertical axis and receives around its hub, 4, the seed-measuring disk $o$, through which holes are formed, as at 5. The disk $o$ is of the desired thickness, and has any desired number of holes and of a size to suit the planting to be effected. These holes 5 should be largest at the bottom, that the seeds may deliver freely. Upon the frame $k$ is a vertical cylinder, $q$, forming the base of the hopper $r$, shown by red lines. This hopper may be of sheet metal of suitable size and shape. The frame $k$ has an offset or ledge, on which the disk $o$ revolves, as seen in fig. 3, and this comes under the hopper, so that the seeds cannot fall through; and $s$ is a movable throat to the bottom of the hopper that allows disks, $o$, of different thicknesses to be introduced. The disk $o$ in its revolution brings its holes around successively under the hopper; they fill with seed, and said seed is carried to near the flaring upper end $t$ of the seed tube $d$, and the ledge of the frame $k$, terminating at this point, allows the seed to fall out of the hole in the disk $o$ and pass down the tube $d$ into the earth.

In my machine all the parts are open to the inspection of the attendant, for he can see the seed fall from the disk $o$ into the seed tube and hence be certain that his field is properly planted; and in case of the supply of seeds stopping he can remove the cause. This machine thus avoids the difficulties that have been experienced in other planters, because the risk of failure in planting is removed.

What I claim, and desire to secure by Letters Patent, is—

1. The movable throat $s$, at the base of the seed hopper, in combination with the seed-measuring disk $o$, (made changeable,) and with the seed tube $d$, as and for the purposes specified.

2. I claim the frame $k$, hinged to the frame $a$, and detachable, as shown, in combination with the hopper $r$, wheels $l$ and $c$, mitre-wheels $m$ and $n$, and seed-measuring disk $o$, as and for the purposes set forth.

In witness whereof I have hereunto set my signature this fifteenth day of January, A. D. 1867.

JAMES EDGE.

Witnesses:
CHAS. H. SMITH,
GEO. D. WALKER.